United States Patent
Beit-Grogger et al.

(10) Patent No.: US 7,327,632 B2
(45) Date of Patent: Feb. 5, 2008

(54) INTERFACE CIRCUIT

(75) Inventors: Andrea Beit-Grogger, Graz (AT); Helmut Koroschetz, Lieboch (AT)

(73) Assignee: Infineon Technologies AG (DE)

( * ) Notice: Subject to any disclaimer, the term of this patent is extended or adjusted under 35 U.S.C. 154(b) by 271 days.

(21) Appl. No.: 11/134,026

(22) Filed: May 19, 2005

(65) Prior Publication Data

US 2005/0254276 A1    Nov. 17, 2005

Related U.S. Application Data

(63) Continuation of application No. PCT/DE03/03653, filed on Nov. 4, 2003.

(30) Foreign Application Priority Data

Nov. 22, 2002    (DE) ............................... 102 54 615

(51) Int. Cl.
*G11C 8/00* (2006.01)
(52) U.S. Cl. ................. 365/233; 365/230.08; 365/239; 365/189.05; 365/189.08; 365/193
(58) Field of Classification Search .......... 365/230.08, 365/189.05, 189.08, 233, 239, 193
See application file for complete search history.

(56) References Cited

U.S. PATENT DOCUMENTS

| | | | |
|---|---|---|---|
| 4,827,490 A * | 5/1989 | Guerin | 375/362 |
| 4,929,849 A | 5/1990 | Paul | |
| 5,289,584 A * | 2/1994 | Thome et al. | 711/109 |
| 5,386,385 A * | 1/1995 | Stephens, Jr. | 365/189.05 |
| 5,627,968 A * | 5/1997 | Ozaki et al. | 709/212 |
| 5,657,292 A * | 8/1997 | McClure | 365/233 |
| 6,055,597 A | 4/2000 | Houg | |
| 2003/0137884 A1* | 7/2003 | Roohparvar | 365/200 |
| 2003/0137885 A1* | 7/2003 | Roohparvar | 365/200 |
| 2004/0196690 A1* | 10/2004 | Roohparvar | 365/154 |

FOREIGN PATENT DOCUMENTS

| | | |
|---|---|---|
| DE | 38 01 547 A1 | 7/1988 |
| DE | 199 61 124 A1 | 6/2001 |
| DE | 100 39 335 A1 | 2/2002 |
| EP | 0 887 740 A1 | 12/1998 |

\* cited by examiner

*Primary Examiner*—Viet Q. Nguyen
(74) *Attorney, Agent, or Firm*—Dickstein, Shapiro, LLP.

(57) ABSTRACT

An interface apparatus having a first and a second buffer storage unit, the first buffer storage unit being associated with a first domain and the second buffer storage unit being associated with a second domain, and the buffer storage units being connected to one another for transmitting data. Each of the storage units is of two-stage design and respectively has a first and a second memory, the first and second buffer storage units are connected by unit of connections between the second memory in one buffer storage unit and the first memory in the other buffer storage unit, and data from one domain being written to the first memory and then to the second memory when a transmission operation is no longer pending between the domains.

11 Claims, 1 Drawing Sheet

INTERFACE CIRCUIT

CROSS-REFERENCE TO RELATED APPLICATION

This application is a continuation of International Patent Application Serial No. PCT/DE2003/003653, filed Nov. 4, 2003, which published in German on Jun. 10, 2004 as WO 2004/049164, and is incorporated herein by reference in its entirety.

FIELD OF THE INVENTION

The invention relates to an interface apparatus having a first buffer storage unit and a second buffer storage unit, the first buffer storage unit being associated with a first domain and the second buffer storage unit being associated with a second domain, and the buffer storage units being connected to one another for the purpose of transmitting data.

BACKGROUND OF THE INVENTION

Interface apparatuses of this type are used to transmit data from a first domain to a second domain. A common problem in this case is that the first and second domains operate at different clock frequencies. When accessing a memory in the interface apparatus, the problem therefore arises that access operations from the two domains, which operate at different clock frequencies, may occur. The different clock frequencies result in conflicts because, for example, one of the domains writes data before the other domain has read previously stored data.

One known solution in the case of small frequency differences is to use "synchronization registers". However, the latter can be used only when the frequency difference is minimal.

Another known solution is to switch the clock over between the clock signal for the first domain and that for the second domain. In such a case, the interface apparatus can therefore operate at either one or the other clock frequency. However, such an implementation of the interface is not always satisfactory. One typical use is, for example, in chip cards, which are provided with both contactless and contacted interfaces and are intended to be used simultaneously in both operating modes. By way of example, data are received in contacted fashion and are transmitted in contactless fashion. Correct operation is not always guaranteed in this instance of application.

SUMMARY OF THE INVENTION

Therefore, it is an object of the invention to specify an interface apparatus that makes it possible to transmit data between two domains having very different clock frequencies.

According to the invention, this object is achieved by means of an interface apparatus of the type mentioned initially, which apparatus is characterized in that each of the buffer storage units is of two-stage design and respectively has a first and a second memory, the first and second storage units being connected by means of connections between the second memory in one buffer storage unit and the first memory in the other buffer storage unit, and data from one domain being written to the memory in the first stage and then to the second memory when a transmission operation is no longer pending between the domains.

In the inventive interface apparatus, a separate memory is therefore provided in each buffer storage unit in order to receive the data from its associated domain. Secondly, a memory which stores data until transmission has been successfully concluded is provided. An advantage of the inventive configuration is that data can be written to the second memory only when the data located therein are no longer needed because they have already been transmitted to the other domain.

BRIEF DESCRIPTION OF THE DRAWINGS

The invention will be explained in more detail below with reference to an exemplary embodiment. In the figures.

DETAILED DESCRIPTION OF PREFERRED EMBODIMENTS OF THE INVENTION

Figure 1:
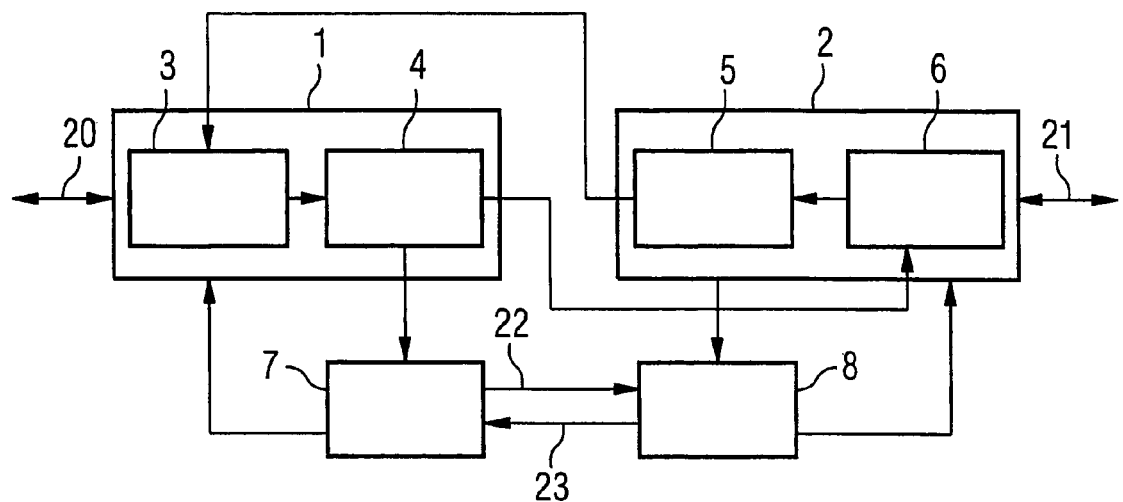
FIG. 1 shows a schematic illustration of an inventive interface apparatus.

FIG. 1 shows an inventive interface apparatus, which has a first buffer storage unit 1 and a second buffer storage unit 2, each of the buffer storage units 1 and 2 being associated with a domain. The task of the interface apparatus is to make it possible for data to be transmitted from one domain to the other domain. The intention is, in particular, for data to be interchanged between domains having asynchronous clock pulses.

In order to explain the manner of operation, it is assumed that data 20 are intended to be transmitted from a first domain to the second domain. The data 20 that are passed to the buffer storage unit 1 are first of all written to a first memory 3 in the first buffer storage unit 1. This is the first stage of the buffer storage unit 1. It is now assumed that all of the transmission operations have been concluded. The data can therefore also be written to the memory 4 in the second stage of the buffer storage unit 1 simultaneously or subsequently. Transmission to the second buffer storage unit 2 is effected from the second memory 4 to a first memory 6 in the second buffer storage unit 2. The second domain can now read the data from the first memory 6 in the second buffer storage unit 2.

However, the data are read only when the requisite number of clock cycles have finished. If the second domain now operates at a considerably lower clock frequency than the first domain, the operation of reading the data from the memory 6 lasts for a corresponding length of time. If further data 20 are now intended to be transmitted from the first domain and these data were to be written directly to the first memory 6 in the second buffer storage unit 2, the data in the first memory 6 would be overwritten, and a transmission error would result on account of a loss of data. For this reason, the data need to be held in the second memory 4 in the first buffer storage unit 1 until the operation of reading from the first memory 6 has been concluded. This is effected using clock synchronization.

Therefore, it needs to be possible for the first buffer storage unit 1 to determine whether such clock synchronization has already been effected before the data in the second memory 4 are changed. To this end, the first buffer storage unit 1 is connected to a synchronization apparatus 7. The latter sends a synchronization signal 22 to a synchronization apparatus 8 that is associated with the second buffer storage unit 2. The synchronization apparatus 8 checks whether clock synchronization has taken place. If this is the case, an acknowledgement signal 23 is passed to the first synchronization apparatus 7. The latter then enables writing from the first memory 3 to the second memory 4 in the first buffer storage unit 1.

Irrespective of the size of the frequency difference between the clock frequencies of the first and second domains, the interface apparatus described ensures that data transmission errors cannot occur on account of the different clock frequencies.

Data are transmitted from the second domain to the first domain in an analogous manner to the described transmission of data from the first domain to the second domain.

The two-stage design of the buffer storage units 1 and 2 makes it possible for the interface apparatus to receive data (which are to be transmitted) even before the operation of transmitting the data to be transmitted beforehand has been concluded. It is possible for both domains to simultaneously use the interface apparatus, with it being possible for one domain to read data and for the other domain to write data.

Figure 2:
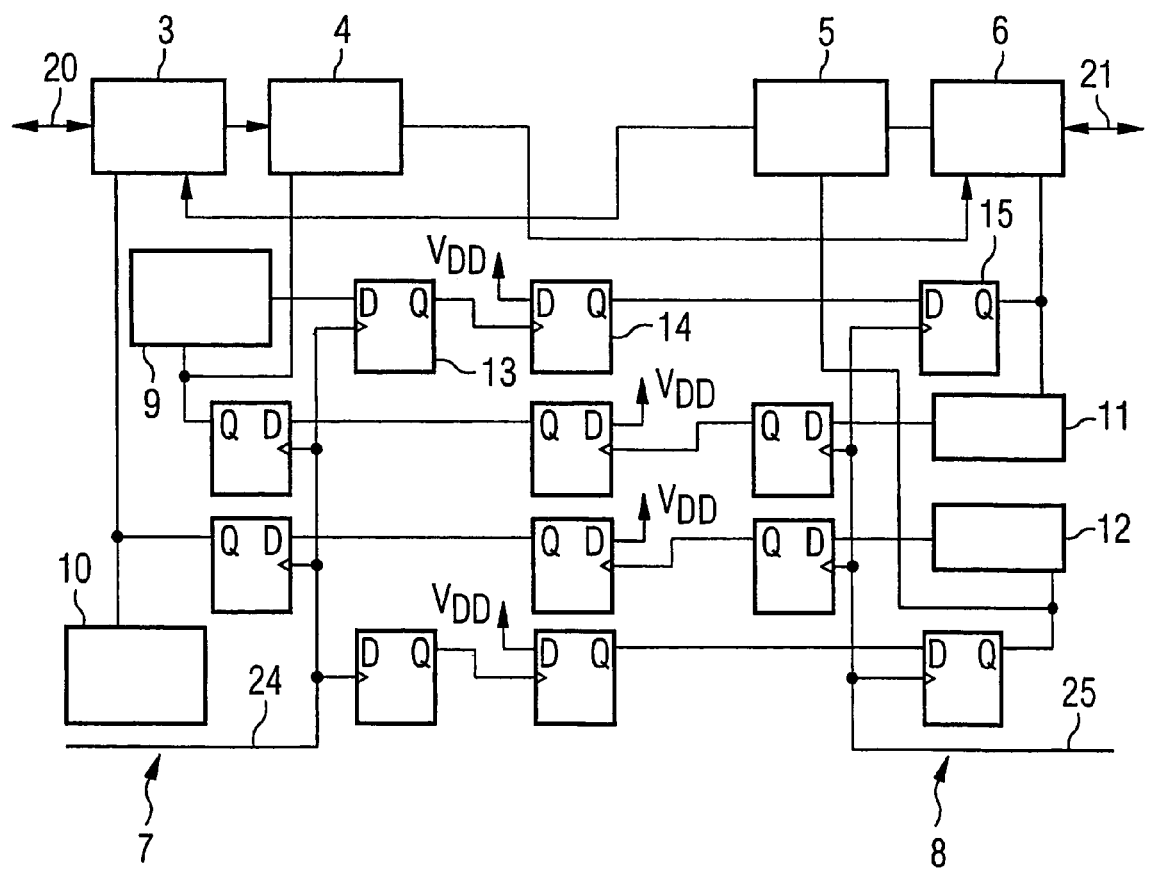
FIG. 2 shows a more detailed illustration of the interface apparatus shown in FIG. 1.

FIG. 2 shows a more detailed illustration of the interface apparatus shown in FIG. 1. In particular, the design of the synchronization apparatuses 7 and 8 is shown in detail. The first synchronization apparatus 7 has an apparatus 9 for generating synchronization signals and an apparatus 10 for generating acknowledgement signals. The output of the apparatus for generating synchronization signals is connected to the input of a D-type flip-flop. A clock signal 24 for the first domain is applied to the clock input of this flip-flop. The signal provided by the apparatus 9 is accepted at the output Q at the point in time at which a clock signal 24 arrives from the first domain. The output Q of this flip-flop is connected to the clock input of a further D-type flip-flop whose input is connected to the operating voltage VDD. On account of this connection, the output signal from the preceding flip-flop appears at the output Q immediately after it has been applied to the clock input. The advantage of this flip-flop in the transition region between the regions which are associated with the first and second domains is that spikes are filtered out. The output signal from the second flip-flop 14 is applied to the input of a third D-type flip-flop 15. This input signal is forwarded to the output if a clock pulse for the second domain is applied to the clock input. The output is connected both to the first memory 6 in the second buffer storage unit 2 and to the apparatus 11 for generating an acknowledgement signal.

After clock synchronization has been effected, the apparatus 11 generates an acknowledgement signal that is sent back, in the same manner, to the apparatus 9 for generating a synchronization signal. In this case, three D-type flip-flops are likewise used. A connection between the first synchronization apparatus 7 and the first and second memories 3 and 4 now makes it possible to write to the second memory 4 once again.

The synchronization apparatuses 7 and 8 operate in the same manner when transmitting data 21 from the second domain to the first domain, with the apparatus 12 generating a synchronization signal and transmitting it to the first synchronization apparatus 7, and the apparatus 10 generating a corresponding acknowledgement signal and transmitting it back if synchronization has been effected.

What is claimed is:

1. An interface apparatus comprising:
  a first buffer storage unit and a second buffer storage unit, the first buffer storage unit being associated with a first domain and the second buffer storage unit being associated with a second domain, and the buffer storage units being connected to one another for transmitting data,
  wherein the buffer storage units are each of two-stage design in that each has a first and a second memory, and are connected by means of connections between the second memory in one buffer storage unit and the first memory in the other buffer storage unit, and
  wherein data from one domain is written to the first memory and then to the second memory when a transmission operation is no longer pending between the domains.

2. The interface apparatus of claim 1, wherein each buffer storage unit is associated with a synchronization apparatus which, when the first memory is changed, sends a synchronization signal to the other synchronization apparatus and, upon reception of an acknowledgement signal, enables writing to the second memory, and which, upon reception of a synchronization signal from the other synchronization apparatus, sends an acknowledgement signal when clock signal synchronization has been effected.

3. The interface apparatus of claim 2, wherein flip-flops are provided in the connecting lines between the synchronization apparatuses for suppressing voltage spikes.

4. The interface apparatus of claim 1, wherein the clock frequency of one buffer storage unit is at least twice as high as that of the other buffer storage unit.

5. A method for transmitting data between first and second buffer storage units associated with first and second domains, respectively, wherein each of the buffer storage units has first and second memories and a synchronization apparatus, the method comprising:
  writing data from one domain to the first memory and then to the second memory when a transmission operation is no longer pending between the domains;
  when the first memory of the first buffer storage unit is changed, the first synchronization apparatus sending a synchronization signal to the second synchronization apparatus;
  upon reception of an acknowledgement signal from the second synchronization apparatus, the first synchronization apparatus enabling writing to the second memory of the first buffer storage unit; and
  upon reception of a synchronization signal from the second synchronization apparatus, the first synchronization signal sending an acknowledgement signal when clock signal synchronization has been effected.

6. The method of claim 5, further comprising the step of suppressing voltage spikes between the synchronization apparatuses.

7. A method for transmitting data between first and second buffer storage units associated with first and second domains, respectively, wherein each of the buffer storage units has first and second memories and a synchronization apparatus, the method comprising writing data from one domain to the first memory and then to the second memory when a transmission operation is no longer pending between the domains, wherein the clock frequency of one buffer storage unit is at least twice as high as that of the other buffer storage unit.

8. An interface apparatus comprising:
  a first buffer storage means and a second buffer storage means, the first buffer storage means being associated with a first domain and the second buffer storage means being associated with a second domain, and the buffer storage means being connected to one another for transmitting data, wherein the buffer storage means are each of two-stage design in that each has a first and a second memory means, and are connected by means of connections between the second memory means in one buffer storage means and the first memory means in the other buffer storage means, and wherein data from one domain is written to the first memory means and then to the second memory means when a transmission operation is no longer pending between the domains.

9. The interface apparatus of claim 8, wherein each buffer storage means is associated with a synchronization means which, when the first memory means is changed, sends a synchronization signal to the other synchronization means and, upon reception of an acknowledgement signal, enables writing to the second memory means, and which, upon reception of a synchronization signal from the other synchronization means, sends an acknowledgement signal when clock signal synchronization has been effected.

10. The interface apparatus of claim 9, wherein flip-flops are provided in the connecting lines between the synchronization means for suppressing voltage spikes.

11. The interface apparatus of claim 8, wherein the clock frequency of one buffer storage means is at least twice as high as that of the other buffer storage means.

* * * * *